April 27, 1965 F. FLATT 3,180,615
HIGH PERFORMANCE ELASTIC FLUID TURBINE
Filed July 29, 1963

INVENTOR.
Friedrich Flatt
BY Dodge and Son
Attorneys

United States Patent Office 3,180,615
Patented Apr. 27, 1965

3,180,615
HIGH PERFORMANCE ELASTIC FLUID TURBINE
Friedrich Flatt, Zurich, Switzerland, assignor to Escher Wyss Aktiengesellschaft, Zurich, Switzerland, a corporation of Switzerland
Filed July 29, 1963, Ser. No. 298,308
Claims priority, application Switzerland, Aug. 24, 1962, 10,092
5 Claims. (Cl. 253—67)

This invention relates to an elastic fluid turbine, in particular to a steam or gas turbine of high performance with a high-pressure part and at least two low-pressure parts, in which the working medium, after leaving the high-pressure part, passes through a first medium-pressure part and thereupon through two second medium-pressure parts connected after said first medium-pressure part and in parallel with each other, before it reaches the low-pressure parts.

A steam turbine of this kind is known, in which each of the two after-connected medium-pressure parts is incorporated with a two-flow low-pressure part. In this construction, the overall length of the low-pressure housings is increased considerably by the built-on second medium-pressure parts. This increase in length of the low-pressure housing, and particularly the increase in length of the corresponding rotor are, however, particularly undesirable when subdivision of the working medium into a large number of partial flows, for example into five or more partial flows, in the low-pressure parts is taken into consideration.

In a steam or gas turbine of the kind hereinbefore described, a constructionally favourable solution is now achieved according to the invention by the fact that at least one of the two after-connected second medium-pressure parts is assembled with the first medium-pressure part in a common housing.

Figure 1:
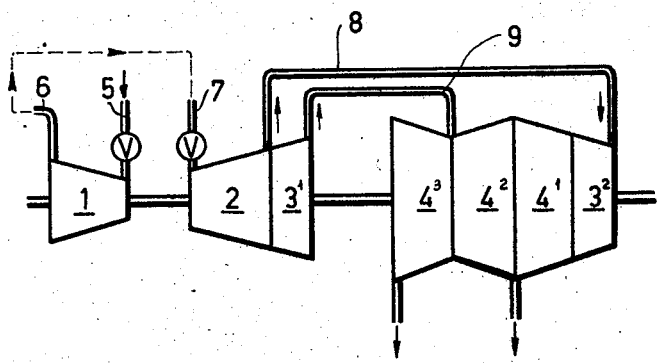
Figure 2:
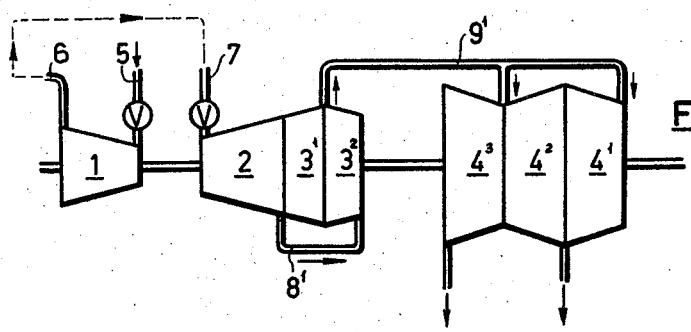
Figure 3:
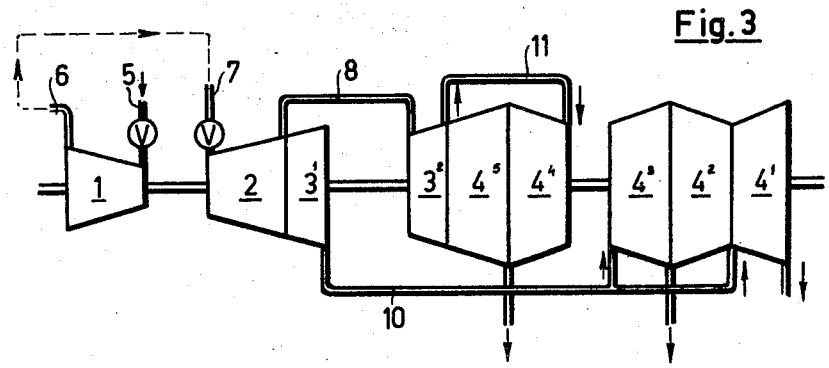

FIGURES 1 to 3 of the accompanying drawings show three different constructional examples of the subject of the invention in simplified presentation.

All these embodiments have a high-pressure part 1, a first medium-pressure part 2, two second medium-pressure parts $3^1$ and $3^2$, connected after said first medium-pressure part 2 and in parallel with each other, as well as low pressure parts $4^1$ and $4^2$ and so forth. The working medium, preferably steam, first passes through a pipe 5 into the high-pressure part 1. After leaving the high-pressure part 1 through a pipe 6, the working medium, if desired after intermediate heating, passes via a pipe 7 to the first medium-pressure part 2, flows through this first medium-pressure part 2 and then through the two second medium-pressure parts $3^1$ and $3^2$, before it enters the low-pressure parts. The medium-pressure part $3^1$ in all cases is assembled with the first medium-pressure part 2 in a common housing.

According to FIGURE 1, three low-pressure parts $4^1$, $4^2$, $4^3$ are provided. The medium-pressure part $3^2$ is assembled in a common housing with these three low-pressure parts. Before the working medium passes from the first medium-pressure part 2 to the second medium-pressure part $3^1$, a partial quantity is tapped off by a pipe 8 and supplied to the second medium-pressure part $3^2$. The working medium flowing from the medium-pressure part $3^1$ through a pipe 9 is distributed between the low-pressure parts $4^2$ and $4^3$, while the working medium leaving the medium-pressure part $3^2$ passes directly into the low-pressure part $4^1$.

According to FIGURE 2, both second medium-pressure parts $3^1$ and $3^2$ are assembled in a common housing with the first medium-pressure part 2. The working medium tapped off between the parts 2 and $3^1$ is supplied to part $3^2$ by a pipe $8^1$. The parts $3^1$ and $3^2$ are so arranged that they have a common working medium outlet. The working medium flowing away is distributed by a pipe $9^1$ among the three low-pressure parts $4^1$, $4^2$, $4^3$ which are connected in parallel with each other and have a common housing.

According to FIGURE 3, in addition to the three low-pressure parts $4^1$, $4^2$, $4^3$ which have a common housing, two low-pressure parts $4^4$, $4^5$ are provided, so that therefore the last expansion stage of the turbine has five parallel-leaving paths for the working medium. The working leaving the medium-pressure part $3^1$ is distributed by a pipe 10 among the individual low-pressure parts $4^1$, $4^2$, $4^3$. The medium-pressure part $3^2$, which via the pipe 8 receives a portion of the working medium leaving the medium-pressure part 2, is assembled in a common housing with the low-pressure parts $4^4$, $4^5$. The inlet side of part $4^5$ is connected directly to the outlet of part $3^2$, while working medium flows to part $4^4$ via a branch pipe 11. The medium-pressure part $3^1$ is here advantageously designed to deal with about ⅗ of the total quantity of working medium, and the medium-pressure part $3^2$ is designed to deal with about ⅖ of that quantity.

What is claimed is:
1. In an elastic fluid turbine having a single output and of the type including a high pressure part, a first medium pressure part, two second medium pressure parts, at least two low pressure parts, and flow connections for leading fluid first through said high pressure part, then through the first medium pressure part, then in parallel through said second medium pressure parts and then in parallel through said low pressure parts, the improvement which comprises
   (a) a first housing for the high pressure part;
   (b) a second housing for said first medium pressure part and at least one of said second medium pressure parts; and
   (c) housing means for the remaining pressure parts.
2. The combination defined in claim 1 in which the outlet of the first medium pressure part is immediately adjacent the inlet end of the second medium pressure part in said second housing.
3. The combination defined in claim 1 in which said second housing also encloses the other second medium pressure part, the inlet of one medium pressure part being immediately adjacent the outlet of the first medium pressure part, and the outlets of the two second medium pressure parts being adjacent one another.
4. The combination defined in claim 1 in which said housing means encloses the other second medium pressure part and said two low pressure parts, the inlet end of one of said low pressure parts being immediately adjacent the outlet end of said other second medium pressure part.
5. The combination defined in claim 1 comprising five low pressure parts and in which said housing means comprises a separate housing for three of said low pressure parts and a separate housing which encloses said other second medium pressure part and the remaining two low pressure parts, the outlet end of said other second medium pressure part being immediately adjacent the inlet end of one of said two remaining low pressure parts, flow connections being provided for leading fluid leaving said one second medium pressure part in parallel to the three separately housed low pressure parts and leading the fluid leaving said other second medium pressure part in parallel to said two low pressure parts commonly housed therewith.

(References on following page)

References Cited by the Examiner

UNITED STATES PATENTS

| | | | |
|---|---|---|---|
| 943,359 | 12/09 | London | 253—67 |
| 1,158,498 | 11/15 | Hodgkinson | 253—67 |
| 1,298,206 | 3/19 | Herr | 253—67 |

FOREIGN PATENTS

| | | |
|---|---|---|
| 367,125 | 10/06 | France. |
| 70,675 | 4/15 | Switzerland. |

KARL J. ALBRECHT, *Primary Examiner*.
JOSEPH H. BRANSON, Jr., *Examiner*.